US005114782A

United States Patent [19]

Nagafuchi

[11] Patent Number: 5,114,782

[45] Date of Patent: May 19, 1992

[54] PROCESSED PAPER FOR DOCUMENTS PROTECTED FROM BEING REPRODUCED

[75] Inventor: Kazumasa Nagafuchi, Hyogo, Japan

[73] Assignee: Kisokaseisangyou Co., Ltd., Osaka, Japan

[21] Appl. No.: 462,707

[22] Filed: Jan. 9, 1990

[30] Foreign Application Priority Data

Nov. 9, 1989 [JP] Japan ..................... 1-291922

[51] Int. Cl.[5] ..................... B32B 3/00

[52] U.S. Cl. ..................... 428/207; 428/208; 428/211; 428/915; 428/916

[58] Field of Search ..................... 428/207, 208, 211, 916, 428/915

[56] References Cited

U.S. PATENT DOCUMENTS

| | | | |
|---|---|---|---|
| 4,578,298 | 3/1986 | Nagafuchi | 428/40 |
| 4,830,902 | 5/1989 | Plantenga et al. | 428/211 X |
| 4,857,386 | 8/1989 | Butters et al. | 428/211 X |
| 4,883,714 | 11/1989 | Stockl et al. | 428/211 X |
| 5,015,318 | 5/1991 | Smits et al. | 428/915 |

FOREIGN PATENT DOCUMENTS

| | | | |
|---|---|---|---|
| 0645308 | 9/1984 | Switzerland | 428/915 |
| 1435686 | 5/1976 | United Kingdom | 428/915 |

*Primary Examiner*—P. C. Sluby

*Attorney, Agent, or Firm*—John F. A. Earley; John F. A. Earley, III

[57] ABSTRACT

A processed paper for documents protected from being photographically and electrostatically reproduced comprises a paper substrate having a front surface, and a colored ink layer and a silvery ink layer coated over the front surface of the paper substrate, the silvery ink layer having a pattern formed thereon to cause photographic and electrostatic reproductions of information recorded on the processed paper to be illegible due to irregular reflections of light from the pattern on the silvery ink layer.

10 Claims, 1 Drawing Sheet

PROCESSED PAPER FOR DOCUMENTS PROTECTED FROM BEING REPRODUCED

TECHNICAL FIELD

This invention relates to a processed paper for documents which is protected from being photographically and electrostatically reproduced. Information may be recorded on the processed paper, and the information is protected from being reproduced by means of electrostatic copiers or cameras.

A known composite film that is capable of being recorded on with information which is to be protected from being reproduced by means of electrostatic copiers or cameras comprises a colored transparent resin film and a metallic foil formed by vacuum deposition on the back of the colored transparent resin film. However, the known composite film has drawbacks associated with it since information recorded on it by hand-writing or printing is illegible, and since the composite film is very expensive due to the high cost of forming a metallic foil by vacuum deposition on the back surface of the resin film.

SUMMARY OF THE INVENTION

An object of the present invention is to provide a processed paper for documents which is protected from being photographically and electrostatically reproduced. The processed paper may be recorded on with very legible information, but reproductions thereof produced by means of electrostatic copiers or cameras become black and are not legible. Another object is to provide such a processed paper at a very low cost.

In accordance with the foregoing objects, the invention provides a processed paper for documents which is protected from being photographically and electrostatically reproduced, which comprises a paper substrate having a front surface, an orange, brown or red colored ink layer coated over on the front surface of the paper substrate, and a silvery ink layer coated over the colored ink layer in a pattern of grain or mesh. The pattern of grain or mesh is a pattern formed in the silvery ink layer that causes photographic and electrostatic reproductions of information recorded on the processed paper to be illegible due to irregular reflections of light from the pattern in the silvery ink layer. As occasion demands, the processed paper further comprises a surface coating agent layer.

Also, in accordance with the foregoing objects, the invention provides a processed paper for documents which is protected from being photographically and electrostatically reproduced, which comprises a paper substrate having a front surface, a silvery ink layer coated over the front surface of the paper substrate in a pattern of grain or mesh, and an orange, brown or red colored transparent ink layer coated over the silvery ink layer. The pattern of grain or mesh is a pattern formed in the silvery ink layer that causes photographic and electrostatic reproductions of information recorded on the processed paper to be illegible due to irregular reflections of light from the pattern in the silvery ink layer.

As the paper substrate, synthetic paper and synthetic fiber paper ma be used in addition to ordinary paper. The silvery ink used in the invention is well-known and is generally used for silvery colored printing. The silvery ink contains particles of metallic aluminum. The surface coating agent used in the invention also is well known and is generally used for coating the silvery ink layer to prevent the silvery ink layer from being oxidized, to prevent the silvery ink layer from being separated, and to maintain the metallic luster of the silvery ink layer. As the surface coating agent vanishes, such as oily vanish, acrylic vanish, etc., resin printing inks, which have been produced by dissolving acrylic resin, polyvinylchloride, polyethylene, etc. in solvents, and so on are used.

DESCRIPTION OF THE DRAWINGS

Preferred embodiments of the invention are illustrated in the figures of the drawings, in which.

DETAILED DESCRIPTION

Figure 1:
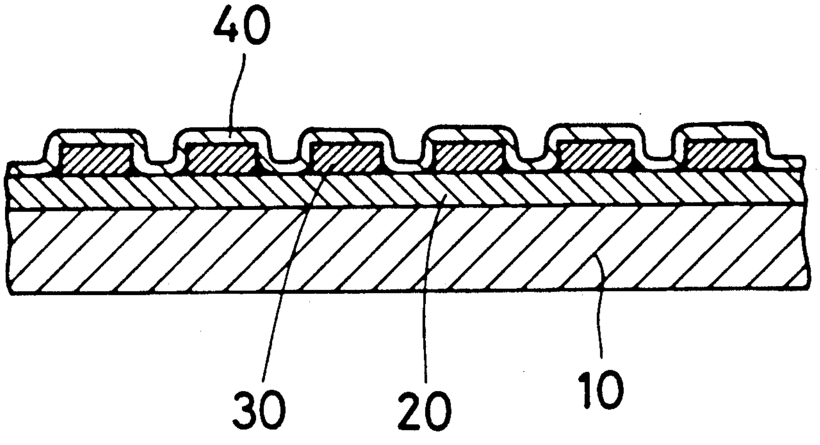
FIG. 1 is an enlarged fragmentary section view of a processed paper according to the first aspect of the invention.

An embodiment of the processed paper for documents which is protected from being photographically and electrostatically reproduced according to the first aspect of the invention is shown in FIG. 1. The processed paper comprises a white paper substrate 10, a brown colored ink layer 20 coated over the front surface of the paper substrate 10, a silvery ink layer 30 coated over the brown colored ink layer in a pattern of grain formed by a great number of circles having a diameter of 0.4 millimeter uniformly spaced over the brown colored ink layer at a distance of 0.5 millimeters between adjacent circles, and a surface coating agent layer 40 coated over the silvery ink layer 30, said surface coating agent layer containing a resin.

In this embodiment, the front surface of a white paper substrate 10 is coated with a brown colored ink which forms a layer 20. Then, the brown colored ink layer 20 is coated with a silvery ink layer 30 in a pattern of grain formed by a great number of extremely fine circles that are uniformly spaced over the colored ink layer with there being a small distance between adjacent circles. Accordingly, information which has been recorded by hand-writing or printing on the brown colored ink layer may be easily read, but the information cannot be reproduced by means of electrostatic copies or cameras, because of irregular reflection caused by the great number of fine circles of the silvery ink layer 30.

In addition, the embodiment further comprises a transparent ink layer 40 coated over the silvery ink layer 30, and the transparent ink layer contains a resin. Accordingly, effects of prevention of the oxidation of the aluminum particles of the silvery ink layer, maintenance of the metallic luster of the layer, and prevention of the separation of the layer are kept for a long time, that is to say, the effect of preventing documents from being reproduced is permanent.

Figure 2:
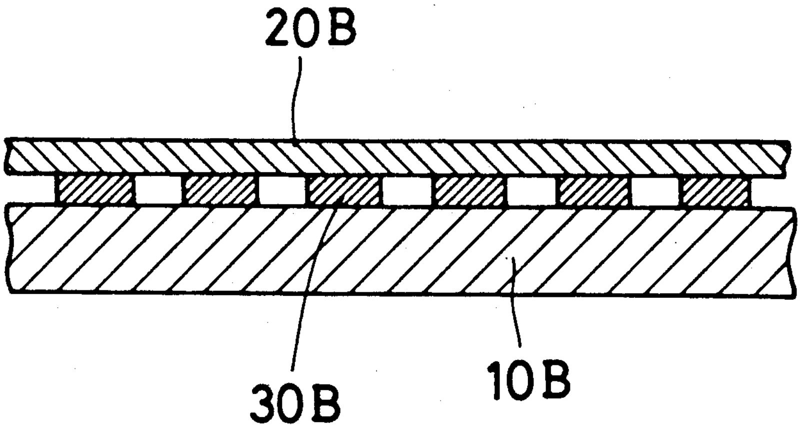
FIG. 2 is an enlarged fragmentary section view of a processed paper according to the second aspect of the invention.

Another embodiment is shown in FIG. 2. The embodiment comprises a white synthetic paper substrate 10B, a silvery ink layer 30B coated over the front-surface of the synthetic paper substrate in a pattern of mesh formed by a great number of fine circles which have a diameter of 0.8 millimeters and which are spaced uniformly over the paper substrate 10B. At a distance of 0.5 millimeters between adjacent circles, and a brown colored transparent ink layer 20B coated over the silvery ink layer 30B.

In this embodiment, the silvery ink layer 30*b* is coated over the front surface of a white synthetic paper substrate 10B in a pattern of mesh formed by a great number of extremely fine circles uniformly spaced over the paper substrate 10B with there being a small distance between adjacent circles, and then, the brown colored transparent ink layer 20B is coated over the front surface. Therefore, it is easy to read information which has been recorded by hand-writing or printing on the processed paper, but when the information has been reproduced by means of electrostatic copiers or cameras, it is very difficult to read reproduced information, because of irregular reflection caused by the great number of fine circles of the silvery ink layer 30B.

This embodiment does not have a transparent ink layer which contains a resin, and which is to be compared with the brown colored transparent ink layer 40 of the embodiment according to FIG. 1. However, due to the colored transparent ink layer 20B, it is possible to obtain, to a tolerable extent, effects of prevention of the oxidation of the aluminum particles, maintenance of the metallic luster and prevention of the separation of the silvery ink layer 30B.

As mentioned above, information recorded on the processed paper is readable, but reproductions of the information produced by means of electrostatic copiers or cameras are not readable. Furthermore, the processed paper may be produced at a low cost, because the paper does not include a metallic foil formed by vacuum deposition, and because the paper may be coated using printing processes in which printing inks are used.

I claim:

1. A processed paper for documents protected from being reproduced, said processed paper comprising a paper substrate having a front surface, an orange, brown or red colored ink layer, coated over all of said front surface and a silvery ink layer coated in a pattern of grain or mesh over all of said colored ink layer.

2. The processed paper of claim 1, further comprising a surface coating agent layer coated over all of said silvery ink layer..

3. A processed paper for documents protected from being reproduced, said processed paper comprising a paper substrate having a front surface, a silvery ink layer coated in a pattern of grain or mesh over all of said front surface and an orange, brown or red colored transparent ink layer coated over all of said silvery ink layer.

4. A processed paper for documents protected from being reproduced, said processed paper comprising a paper substrate having a front surface, and prevention means for preventing legible photographic and electrostatic reproduction of the document, said prevention means including an orange, brown or red colored ink layer coated over said front surface and a silvery ink layer coated over said colored ink layer, said silvery ink layer having pattern means formed thereon for causing irregular reflections of light used in photographic and electrostatic reproduction.

5. A processed paper for documents protected from being reproduced as claimed in claim 4, further comprising surface coating agent layer means coated over the silvery ink layer for coating the silvery ink layer to prevent the silvery ink layer from being oxidized, to prevent the silvery ink layer from being separated, and to maintain the metallic luster of the silvery ink layer.

6. The processed paper of claim 4, the pattern means including a plurality of circles having a diameter of about 0.4 millimeters with adjacent circles having a distance of about 0.5 millimeters between them.

7. The processed paper of claim 4, the pattern means including a plurality of circles having a diameter of about 0.8 millimeters with adjacent circles having a distance of about 0.5 millimeters between them.

8. A processed paper for documents protected from being reproduced, said processed paper comprising a paper substrate having a front surface, and prevention means for preventing legible photographic and electrode reproduction of the document, said prevention means including a silvery ink layer coated over said front surface and an orange, brown or red colored transparent ink layer coated over said silvery ink layer, said silvery layer having pattern means formed thereon for causing irregular reflection of light used in photographic and electrostatic reproduction.

9. The processed paper of claim 8, the pattern means including a plurality of circles having a diameter of about 0.4 millimeters with adjacent circles having a distance of about 0.5 millimeters between them.

10. The processed paper of claim 8, the pattern means including a plurality of circles having a diameter of about 0.8 millimeters with adjacent circles having a distance of about 0.5 millimeters between them.

* * * * *